United States Patent
Ying et al.

(10) Patent No.: US 7,460,074 B2
(45) Date of Patent: Dec. 2, 2008

(54) COMMUNICATION TERMINALS HAVING INTEGRATED ANTENNA AND SPEAKER ASSEMBLIES

(75) Inventors: Zhinong Ying, Lund (SE); Wanqing Shi, Hjärup (SE)

(73) Assignee: Sony Ericsson Mobile Communications AB, Lund (SE)

( * ) Notice: Subject to any disclaimer, the term of this patent is extended or adjusted under 35 U.S.C. 154(b) by 225 days.

(21) Appl. No.: 10/560,792

(22) PCT Filed: Jun. 4, 2004

(86) PCT No.: PCT/EP2004/051037

§ 371 (c)(1),
(2), (4) Date: Dec. 15, 2005

(87) PCT Pub. No.: WO2004/114637

PCT Pub. Date: Dec. 29, 2004

(65) Prior Publication Data

US 2006/0152417 A1    Jul. 13, 2006

Related U.S. Application Data

(60) Provisional application No. 60/483,549, filed on Jun. 27, 2003.

(30) Foreign Application Priority Data

Jun. 20, 2003  (EP) ................................ 03013926

(51) Int. Cl.
*H01Q 1/24* (2006.01)

(52) U.S. Cl. ................... 343/702; 343/720; 343/829; 343/846

(58) Field of Classification Search ................ 343/702, 343/720, 829, 846, 700 MS; 455/575.7
See application file for complete search history.

(56) References Cited

U.S. PATENT DOCUMENTS

| 4,367,426 | A  | * | 1/1983 | Kumada et al. | 310/358 |
| 4,851,654 | A  | * | 7/1989 | Nitta | 235/492 |
| 5,904,654 | A  | * | 5/1999 | Wohltmann et al. | 600/481 |
| 6,819,939 | B2 | * | 11/2004 | Masamura | 455/550.1 |
| 6,973,710 | B2 | * | 12/2005 | Kiguchi et al. | 29/601 |
| 7,126,546 | B2 | * | 10/2006 | Annamaa et al. | 343/702 |

(Continued)

FOREIGN PATENT DOCUMENTS

JP    2001217633 A    8/2001

(Continued)

OTHER PUBLICATIONS

International Search Report corresponding to PCT/EP2004/051037, mailed Oct. 13, 2004.

*Primary Examiner*—Douglas W. Owens
*Assistant Examiner*—Chuc Tran
(74) *Attorney, Agent, or Firm*—Myers Bigel Sibley & Sajovec

(57) ABSTRACT

Communications devices having a combined antenna and speaker for a radio receiving apparatus is provided. The combined antenna and speaker includes a speaker and a low profile built-in radio antenna element. The antenna element includes a flat sheet carrying a conductive antenna trace. An exciter is connected to the sheet and devised to induce vibrations therein for generating sound. This integrates a flat panel speaker with the antenna element, which saves components and may increase performance.

14 Claims, 3 Drawing Sheets

U.S. PATENT DOCUMENTS

| | | | |
|---|---|---|---|
| 7,136,625 B2 * | 11/2006 | Ylitalo et al. | 455/90.3 |
| 7,382,890 B2 * | 6/2008 | Saiki et al. | 381/152 |
| 2002/0127974 A1 * | 9/2002 | Song | 455/90 |
| 2003/0003954 A1 | 1/2003 | Kugler | |

FOREIGN PATENT DOCUMENTS

| | | |
|---|---|---|
| WO | WO 00/038475 | 6/2000 |
| WO | WO 02/050944 A1 | 6/2002 |
| WO | WO 03/003505 A1 | 1/2003 |
| WO | WO 03/003506 A1 | 1/2003 |

* cited by examiner

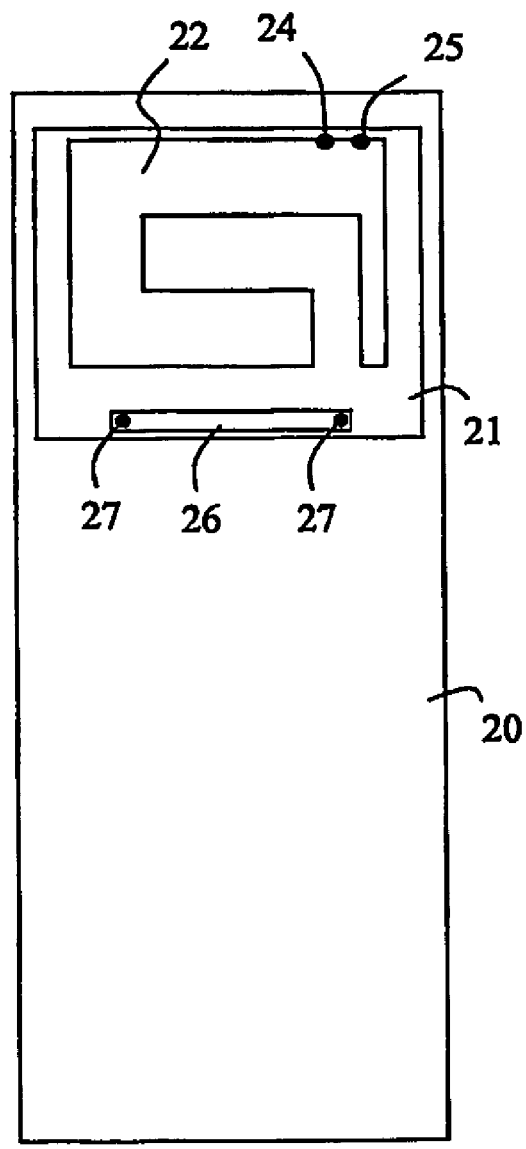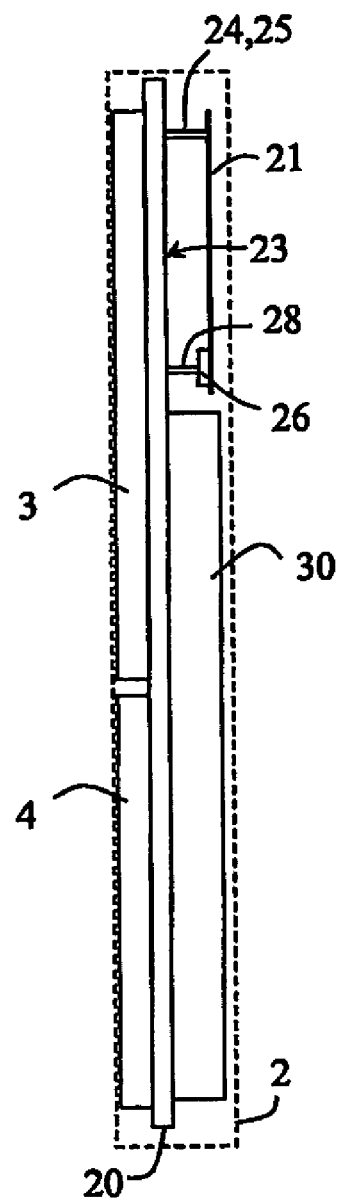
Fig. 2
Fig. 3

COMMUNICATION TERMINALS HAVING INTEGRATED ANTENNA AND SPEAKER ASSEMBLIES

RELATED APPLICATIONS

The present application is a 35 U.S.C. §371 national phase application of PCT International Application No. PCT/EP2004/051037, having an international filing date of Jun. 4, 2004, and claiming priority to European Patent Application No. 03013926.5, filed Jun. 20, 2003 and U.S. Provisional Application Ser. No. 60/483,549, filed Jun. 27, 2003, the disclosures of which are incorporated herein by reference in their entireties. The above PCT International Application was published in the English language and has International Publication No. WO 2004/114637.

FIELD OF THE INVENTION

The present invention relates generally to a radio receiver comprising an antenna for receiving radio signals and means for converting received radio signal into sound, and a speaker for conveying sound to a user. In particular, the invention relates to a radio communication terminal comprising such an antenna and speaker.

BACKGROUND

The mobile phone industry has had an enormous development both regarding quality of service and transmission capabilities, as well as the technology for producing advanced communications terminals. In only a couple of decades the communication systems have gone from analogue to digital, and at the same time the dimensions of the communication terminals have gone from briefcase size to the pocket size phones of today. Still today, mobile phones are getting smaller and smaller and the size is generally considered to be an important actor for the end customer. The development in electronics has made it possible to miniaturise the components of the terminals, at the same time making the terminals capable of performing more advanced functions and services. The development of new transmission schemes, the so-called $3^{rd}$ generation mobile system standing at the door and the $4^{th}$ generation to be expected maybe ten years later, also provides the possibility to convey more advanced data to the wireless communication terminals, such as real time video.

In order to benefit from the capabilities of the transmission system, the future generation of phones will have a large display in order to perform multimedia input and output, and the picture quality will be of high importance. Still, the keypad or keyboard must be large enough to allow people to press one key at the time. With the development of the communication systems and the capabilities of multimedia functions, the demands on the sound quality from the terminals will also increase. In the next generation of terminals using W-CDMA technique, it will be possible to use a wider audio frequency band. The speaker of the terminal ray also be used as a ringer instead of a traditional buzzer, for a single tone or polyphonic ring signals, and as a hand free speaker built-in into the phone. Normally, these functions are performed by a second speaker mounted in the back of the phone, but combined speakers for two or all three of these functions exist.

In a conventional state of the art communication terminal a terminal audio output is mounted on the front of the terminal above the display with the speaker immediately behind the output. This means that even with a smallest available speaker used today, with a diameter of about 13 mm, the terminal would be approximately this much longer in its longitudinal extension than what would have been the case if only the display and/or keypad had defined the length of the terminal. The antenna of the terminal is generally located at the upper portion of the backside of the terminal, the lower backside being occupied by a battery. Placing the speaker behind the display would therefore increase the thickness of the terminal 1 since it would have to compete with the antenna for the relevant space.

The performance of the speaker is to a high extent dependent on the back volume, i.e. the acoustic resonance cavity behind the speaker. For best performance, the back volume should be sealed. In a normal case the whole phone is used as back volume, but it is almost possible to seal a phone. As mentioned above, almost every phone today has the speaker position in the upper parts of the front of the terminal above the display and keyboard. This means that the height of the speaker, display and the keyboard determines the length of the phone. Since the speaker performances is highly dependent on the dimension, reduction of the speaker size results in less good acoustics. There is also a general desire to have larger displays in the communication terminal, not just wider but also longer, and with the common layout of the keyboard which people are used to, the height of the terminal can basically not be reduced more than today without resulting drawbacks to the display or keypad.

In US 2002/0137478, assigned to NEC Viewtechnology, a design is proposed in which the speaker and also the microphone are moved to the back side of a terminal. The publication mainly relates to a so called clamshell design, but is equally applicable to a standard stick-type terminal. The speaker and the microphone are devised as identical flat panel type speakers. When using the terminal for voice communication the upper speaker acts as a normal terminal speaker, and the lower speaker is used in a reversed function as a microphone. Furthermore, the two speakers can be used for reproducing stereophonic sound from e.g. FM radio stations. By placing the upper speaker on the back side of the terminal, the length of the terminal may be reduced, or alternatively the display may be increased. However, the thickness of the terminal is instead increased, since the speaker is placed behind the display instead of above it.

SUMMARY OF THE INVENTION

There is consequently still a need for improved solutions for miniaturising radio receivers, particularly portable devices, this being an overall object of the present invention.

In particular, it is an object to overcome the deficiencies related to the state of the art radio communication terminal as recited above. More specifically, it is an object to provide a speaker arrangement for a communication terminal making it possible to decrease the outer terminal dimensions.

According to a first aspect of the present invention, this object is fulfilled by a communication terminal comprising a speaker and a low profile built-in radio antenna element, wherein said antenna element comprises a flat sheet carrying a conductive antenna trace, and where an exciter is connected to said sheet and devised to induce vibrations therein for generating sound. This implements a flat panel speaker in the terminal, by using the antenna element. Thereby, both space and components are saved, which can be used for increasing other components of the terminal, or for miniaturising the terminal.

Preferably, said sheet is made from an insulating material, such as a plastic material or a ceramic material.

In one embodiment, said exciter is connected adjacent to a side edge of said antenna element.

Advantageously, said exciter is insulated from said antenna trace.

Preferably, said exciter comprises first and second speaker signal connectors.

In one embodiment, said antenna trace defines an antenna patch.

Advantageously, said antenna trace is connected to a radio feed circuit of the terminal, and to a ground plane which is spaced from the antenna patch.

Preferably, said antenna element is positioned parallel to a ground plane, wherein a spacing between the antenna element and the ground plane acts as an electromagnetic resonance cavity.

In one embodiment, a cover member of the terminal comprises an aperture adjacent to said antenna element.

Advantageously, a sound channel extends from a position adjacent to said antenna element to a channel front outlet at a front side of the terminal.

Preferably, said antenna trace comprises a substantially flat pattern of conductive material on said antenna element.

In one embodiment, said antenna trace is printed on said antenna element. Alternatively, said antenna trace is etched out on said antenna element.

According to a second aspect of the present invention, the stated object is fulfilled by a combined antenna and speaker for a radio receiving apparatus, comprising a speaker and a low profile built-in radio antenna element, wherein said antenna element comprises a flat sheet carrying a conductive antenna trace, and where an exciter is connected to said sheet and devised to induce vibrations therein for generating sound.

In summary, the present invention integrates a flat panel speaker with the antenna element. Thereby, both space and components may be saved. Furthermore, compared to solutions introducing auxiliary elements, such as a speaker, in the space between the antenna plane and the ground plane for the purpose of miniaturising the terminal, the present invention provides increased antenna performance.

BRIEF DESCRIPTION OF THE DRAWINGS

Further features and advantages of the present invention will become more apparent from the following description of preferred embodiments, with reference to the accompanying drawings, on which FIG. 1 schematically shows a stick-type radio communication terminal;

FIG. 2 schematically illustrates a combined antenna and speaker according to the invention, arranged on a back side of a PCB of the terminal in FIG. 1;

FIG. 3 schematically illustrates a cross-sectional side view of the arrangement of FIG. 2;

DETAILED DESCRIPTION OF EMBODIMENTS OF THE INVENTION

The present invention relates to radio receivers, by which is meant a device comprising at least a radio antenna for receiving radio terminals, means for converting received radio signal into sound, and a speaker for conveying sound to a user. In particular, the invention relates to a radio communication terminal comprising such an antenna and speaker, and the detailed description below refers almost exclusively to embodiments of the invention implemented in portable radio communication terminals. However, it should be realised that the invention may be applied to any radio receiver, stationary or mobile, which may or may not include radio transmission capabilities. The term communication terminal includes all mobile equipment devised for radio communication with a radio station, which radio station also may be a mobile terminal or e.g. a stationary base station. Consequently, the term "communication terminal" includes mobile phones, pagers, communicators, electronic organisers, smart phones, PDA:s (Personal Digit Assistants), vehicle-mounted radio communication devices or the like, as well as portable laptop computers devised for wireless communication in for instance WLAN (Wireless Local Area Network). Furthermore, since the design and present invention is suitable for but not restricted to mobile use, the term "communication terminal" should also be understood as to include any stationary device arranged for radio communication, such as for instance desk top computers, printers, fax machines and so on, devised to operate with radio communication with each other or some other radio station. Hence, although the structure and characteristics of the antenna design according to the invention is mainly described herein, by way of example, in the implementation in a mobile phone, this is not to be interpreted as excluding the implementation of the inventive design in other types of radio terminals, such as those listed above. Furthermore, it should be emphasised that the term "comprising" or "comprises" when used in this description and in the appended claims to indicate included features, elements or steps, is in no way to be interpreted as excluding the presence of other features, elements or steps than those expressed or stated.

Figure 1:
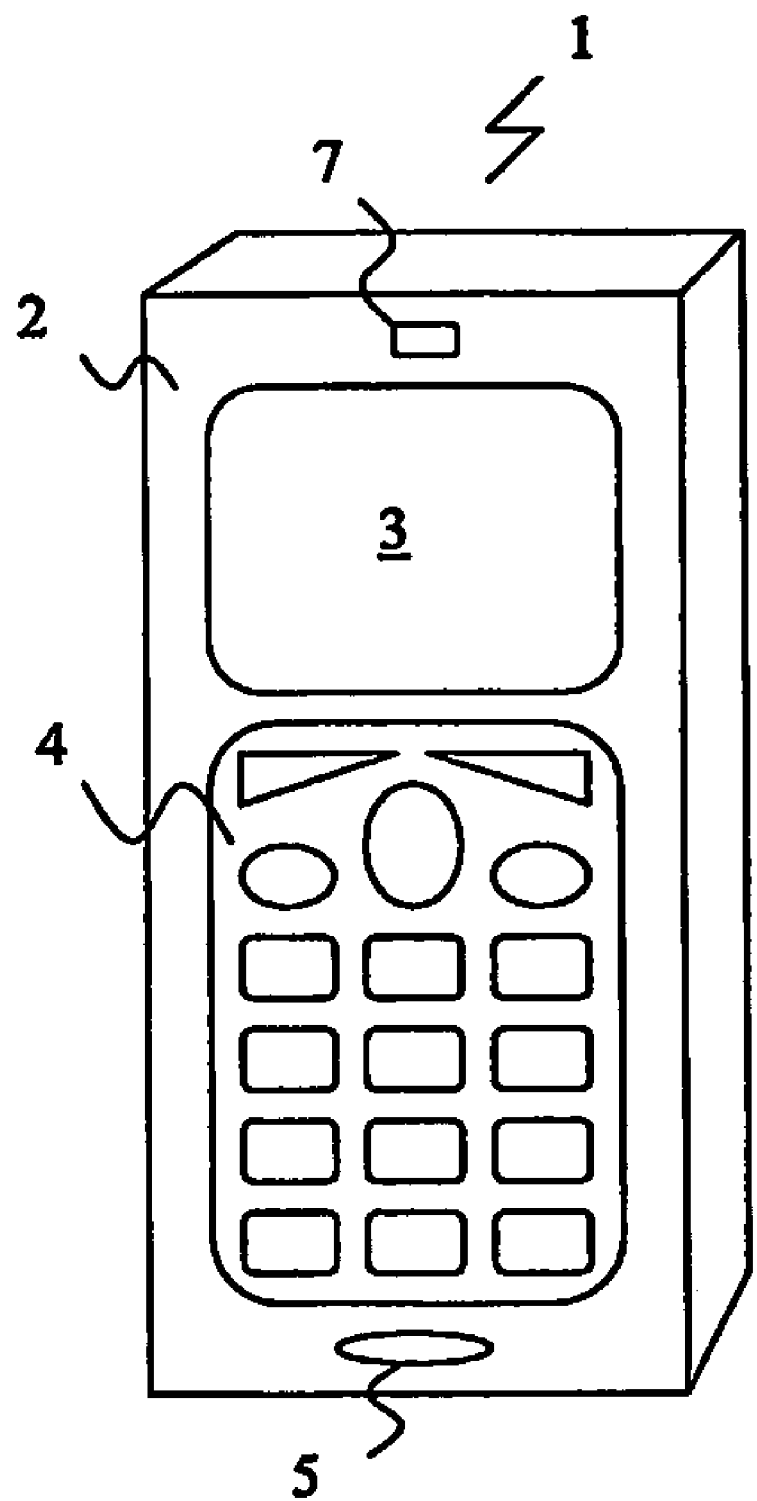

FIG. 1 discloses a typical stick-type radio communication terminal or mobile phone 1, carried by a housing or cover 2. The cover may include plural cover members, such as a front cover and a back cover. For data and information input purposes, terminal 1 comprises a keypad 4 and a microphone 5, and for data and information output purposes terminal 1 comprises a display 3 and a speaker 6 (not shown). In the displayed embodiment, the speaker is connected by a sound channel or aperture 7 at the upper front side of terminal 1. The display 3 and the keypad 4 basically set the limit of how small, or more correctly how short, the terminal 1 can be, together with the space occupied by the speaker. However, to be able to work as a standard phone for voice interaction, the terminal 1 also includes a microphone 5 and a speaker 6, preferably arranged at opposite ends of the terminal 1. In an alternative embodiment, as such included in the state of the art, the display occupies a larger portion of the front side of the terminal, with several of the functions of the keypad included in a graphical user interface applicable to the display, rendering a data input interface having less keys. Those keys may also be moved to the side of the communication terminal in order to allow for the display to occupy an even larger portion of the front side of terminal. A specific tool may furthermore be provided for inputting data on a touch-sensitive screen of the display.

The present invention makes use of a so called flat panel speaker design for generating sound. Such a speaker design has better performance for polyphonic ring signals and FM radio sound than a conventional magnet speaker. Furthermore, according to the invention, the speaker is integrated with a low profile built in antenna. This way, space is saved in a radio receiving device, and less components are used than in a conventional device.

FIG. 2 illustrates schematically a back side of a Printed Circuit Board PCB 20 of a radio communication terminal, with attached components. FIG. 3 illustrates a cross-sectional side view the terminal, showing the PCB 20, a battery 30, a display 3, a keypad 4, and a terminal cover 2 indicated by the dashed line. At an upper end of PCB 20, an antenna element 21 is disposed. The antenna element 21 is a flat sheet or film carrying a metal trace 22, which metal trace constitutes a patch antenna 22. The antenna element 21 is arranged parallel to and at a preselected distance from a ground plane 23 disposed as a layer on or inside PCB 20. The ground plane preferably extends the entire length of PCB 20, but may optionally only cover a portion of the PCB 20. The spacing between the antenna element 21 and the ground plane 23 serves an electromagnetic cavity. Dependent on the particular embodiment of the antenna patch, the distance between the antenna element 21 and the ground plane 23 may be critical for good Voltage Standing Wave Ratio VSWR and gain, and normal distances between these two planes is 5-10 mm. The antenna need both feeding and grounding FIG. 2 merely an example, and in this embodiment feeding is provided at 24, whereas ground is connected at 25.

The antenna element is made from an insulating material which is microwave low loss, such as plastic. The material is preferably some form of polymer, e.g. a polyimide such as Kapton®. In an alternative embodiment, the sheet of antenna element 21 is made from a ceramic.

The definite design of the antenna trace is not critical for the invention, and the trace may include one or more parasitic elements apart from the antenna patch 22. The antenna may be tuned to handle reception, and preferably transmission, from 800 MHz up to 6000 MHz. Antenna patches with plural arms, such as the one illustrated, can be selected for multiple band performance. The antenna trace is conductive, preferably metallic, e.g. made from copper. The antenna trace is in one embodiment printed on the antenna element sheet 21, and in an alternative embodiment etched out of a conductive layer on the antenna element 21. The antenna trace 22 may be disposed on the side of antenna element 21 facing ground lane 23, on the opposite side, or on an intermediate layer.

An exciter or actuator 26 is disposed in direct mechanical contact with said sheet 21. Preferably, the exciter 26 is disposed adjacent to a side edge of said antenna element 21, on the side facing the ground plane 23. The exciter 26 has first and second connection pads 27 for connecting to electric leads 28, which leads 28 connect electrical sound signals to the exciter 26. Exciter 26 is devised to act as a vibrator, inducing vibrations into the sheet 21 carrying the antenna trace 22, such that sound waves are generated by the vibrating sheet 21. Consequently, sheet 21 acts both as an antenna carrier and as a speaker. In a preferred embodiment, exciter 26 comprises a piezoelectric crystal, which expands and contracts dependent on said electrical signals, for generating said vibrations. A drive circuit (not shown) for the exciter 26 is preferably mounted on PCB 20, connected to said leads 28.

Figure 4:
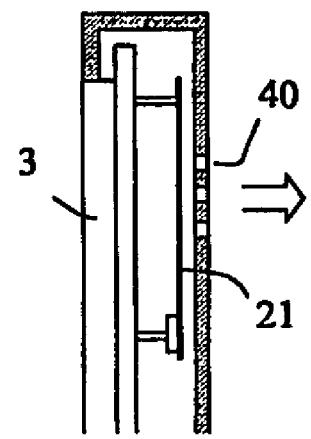
FIGS. 4 to 6 illustrate various embodiments of the present invention, and particularly means for conveying sound generated by the speaker to a user.
Figure 5:
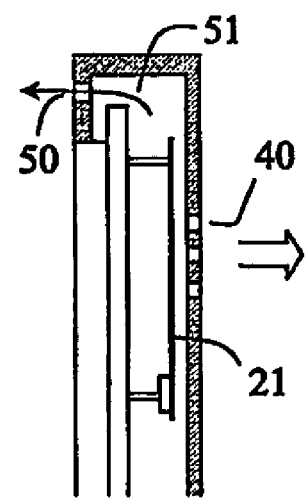
Figure 6:
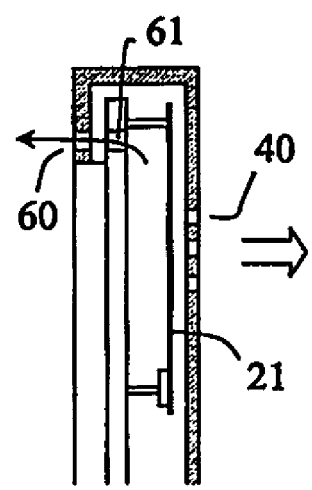

FIGS. 4 to 6 illustrate cut away portions of different embodiments of the present invention, similar to that of FIGS. 2 and 3. However, FIGS. 4 to 6 illustrate different solutions for outputting sound from the speaker, i.e. the sound generated in the sheet 21, to a user. As previously mentioned, sheet 21 is disposed at a predetermined distance from ground plane 23, as is illustrated in FIGS. 3 to 6. A frame, preferably insulating, is used to hold the sheet in position, though not shown in the drawings. It should be noted that reference markings for previously described elements are not included in FIGS. 4-6, although these elements are also included in the embodiments of FIGS. 4 to 6.

FIG. 4 illustrates an embodiment with a first sound aperture 40 in cover 2 on the back side of the terminal, adjacent to sheet 21, and preferably adjacent to a centre portion of sheet 21. The sound aperture 40 may include plural openings, as illustrated.

FIG. 5 illustrates a different embodiment, in which, apart from said first sound aperture 40, a second sound aperture 50 is formed in cover 2 on the front side of the terminal. Sound is led from sheet 21 through a sound channel 51 over, or optionally at a side of, display 3 to said second aperture 50, which corresponds to aperture 7 in FIG. 1.

FIG. 6 illustrates a variant of the embodiment in FIG. 5. Herein, a sound channel 61 passes through an opening in PCB 20, to a front side second aperture 60, also corresponding to aperture 7 of FIG. 1. Since a flat panel speaker transmits sound in both directions from the vibrating plane, though in opposite phase, sound channel 61 may be connected to the forward facing side of sheet 21.

The first sound aperture 40, 50, 60 is particularly usable for conveying polyphonic signals, such as from FM radio or a media player. When the speaker realised by sheet 21 is used for e.g. voice calls, the back side aperture may lead to privacy problems. This may be solved e.g. by volume control, or by closing means (not shown) which cover the first aperture 40, 50, 60. Such closing means may be realised by a sliding latch which slides in front of the openings of the first aperture when the terminal is arranged in talk mode, where talk mode may be defined by opening a lid or separating two parts of a clamshell terminal to a predetermined position. Alternatively, an auxiliary speaker (not shown) may be included for conveying audio during voice calls.

The foregoing has described the principals, preferred embodiments and modes of operation of the present invention. However, the invention should not be construed as being limited to the particular embodiments discussed above. For example, it is well known in the state of the art to design mobile or cellular phones in a foldable housing, a so called clamshell. Still, the desire to have small terminals is equally applicable to such a design, and so is the proposed solution according to the present invention. Furthermore, the present invention is usable in other types of devices than in a radio communication terminal. Thus, the above described embodiments should be regarded as illustrative rather than restrictive, and it should be appreciated that variations may be made in those embodiments by those skilled in the arts without departing from the scope of the present invention as defined in the appended claims.

The invention claimed is:

1. A communication terminal comprising a speaker and a low profile built-in radio antenna element, wherein said antenna element comprises a flat sheet incorporating a conductive antenna trace, and wherein an exciter is connected to said sheet such that the exciter is in direct mechanical contact with the flat sheet and devised to induce vibrations therein for generating sound, said antenna trace having a substantially flat pattern of conductive material carried on said sheet, wherein the exciter comprises a piezoelectric crystal configured to expand or contract responsive to electrical signals to induce the vibrations.

2. The communication terminal as recited in claim 1, wherein said sheet is made from an insulating material.

3. The communication terminal as recited in claim 2, wherein said sheet is made from a plastic material.

4. The communication terminal as recited in claim 2, wherein said sheet is made from a ceramic material.

5. The communication terminal as recited in claim 1, wherein said exciter is connected adjacent to a side edge of said antenna element.

6. The communication terminal as recited in claim 1, wherein said exciter is insulated from said antenna trace.

7. The communication terminal as recited in claim 1, wherein said exciter comprises first and second speaker signal connectors.

8. The communication terminal as recited in claim 1, wherein said antenna trace defines an antenna patch.

9. The communication terminal as recited in claim 1, wherein said antenna trace is connected to a radio feed circuit of the terminal, and to a ground plane which is spaced from the antenna patch.

10. The communication terminal as recited in claim 1, wherein said antenna element is positioned parallel to a ground plane, wherein a spacing between the antenna element and the ground plane acts as an electromagnetic resonance cavity.

11. The communication terminal as recited in claim 1, wherein a cover member of the terminal comprises an aperture adjacent to said antenna element.

12. The communication terminal as recited in claim 1, wherein a sound channel extends from a position adjacent to said antenna element to a channel front outlet at a front side of the terminal.

13. The communication terminal as recited in claim 1, wherein said antenna trace is printed on said sheet.

14. The communication terminal as recited in claim 1, wherein said antenna trace is etched out on said antenna element.

* * * * *